US012609993B2

(12) United States Patent
Pleiman et al.

(10) Patent No.: US 12,609,993 B2
(45) Date of Patent: *Apr. 21, 2026

(54) LOCAL ALERTS ON NON-LOCAL CHANNELS

(71) Applicant: DISH Network L.L.C., Englewood, CO (US)

(72) Inventors: Eric Pleiman, Centennial, CO (US); Joseph Tomko, Castle Rock, CO (US)

(73) Assignee: DISH Network L.L.C., Englewood, CO (US)

( * ) Notice: Subject to any disclaimer, the term of this patent is extended or adjusted under 35 U.S.C. 154(b) by 44 days.

This patent is subject to a terminal disclaimer.

(21) Appl. No.: 18/912,073

(22) Filed: Oct. 10, 2024

(65) Prior Publication Data

US 2025/0039272 A1     Jan. 30, 2025

Related U.S. Application Data

(63) Continuation of application No. 17/954,078, filed on Sep. 27, 2022, now Pat. No. 12,149,595.

(51) Int. Cl.
*H04L 67/55* (2022.01)
*H04L 67/52* (2022.01)

(52) U.S. Cl.
CPC .............. *H04L 67/55* (2022.05); *H04L 67/52* (2022.05)

(58) Field of Classification Search
CPC ................................ H04L 67/55; H04L 67/52
See application file for complete search history.

(56) References Cited

U.S. PATENT DOCUMENTS

| | | | |
|---|---|---|---|
| 3,848,193 A | 11/1974 | Martin et al. | |
| 7,047,050 B1 * | 5/2006 | Khawand ......... | H04W 52/0245 455/67.11 |
| 8,949,885 B2 | 2/2015 | Strong | |
| 2004/0201471 A1 | 10/2004 | Primm et al. | |
| 2006/0206568 A1 | 9/2006 | Verma et al. | |
| 2006/0287972 A1 | 12/2006 | Kelso et al. | |

(Continued)

OTHER PUBLICATIONS

Appendix 1 to the Specification, A Guide to the Emergcy Alert System (EAS) and Wireless Emergency Aler (WEA) System, downloaded from the Internet on Sep. 14, 2022 at https://www.fcc.gov/files/emergencyalertingpresentation725018pptx.

*Primary Examiner* — Benjamin M Thieu

(74) *Attorney, Agent, or Firm* — Wash Park IP Ltd.; John T. Kennedy

(57) ABSTRACT

Devices, systems and processes for providing local alerts to users via non-local channels are described. A process may include receiving, by a content distributor system, an alert message. The alert message includes a first alert condition and a second alert condition. The first alert condition and the second alert condition are identified in the alert message, and an alert notice is generated, based on the identified alert conditions, and transmitted to a user device coupled to the content distributor system. The first alert condition specifies an alert type. The second alert condition specifies a time period. The alert message may include a third alert condition specifying an action for a user of the user device to take or refrain from taking during the time period and the alert notice may identify the action. The alert message may include a target condition and the alert notice identifies actions to be performed.

20 Claims, 6 Drawing Sheets

(56)          References Cited

U.S. PATENT DOCUMENTS

| | | | |
|---|---|---|---|
| 2007/0174768 A1 | 7/2007 | Sen et al. | |
| 2009/0134982 A1 | 5/2009 | Robertson et al. | |
| 2010/0112975 A1* | 5/2010 | Sennett | H04W 4/90 |
| | | | 455/404.1 |
| 2013/0031581 A1* | 1/2013 | Narasimhan | H04N 21/4122 |
| | | | 725/33 |
| 2013/0281047 A1* | 10/2013 | Daly | H04H 20/71 |
| | | | 455/404.1 |
| 2014/0327547 A1 | 11/2014 | Johnson et al. | |
| 2017/0111779 A1 | 4/2017 | Sennett et al. | |
| 2023/0005615 A1 | 1/2023 | Mancl et al. | |
| 2023/0361898 A1* | 11/2023 | Shintani | H04N 21/25841 |

* cited by examiner

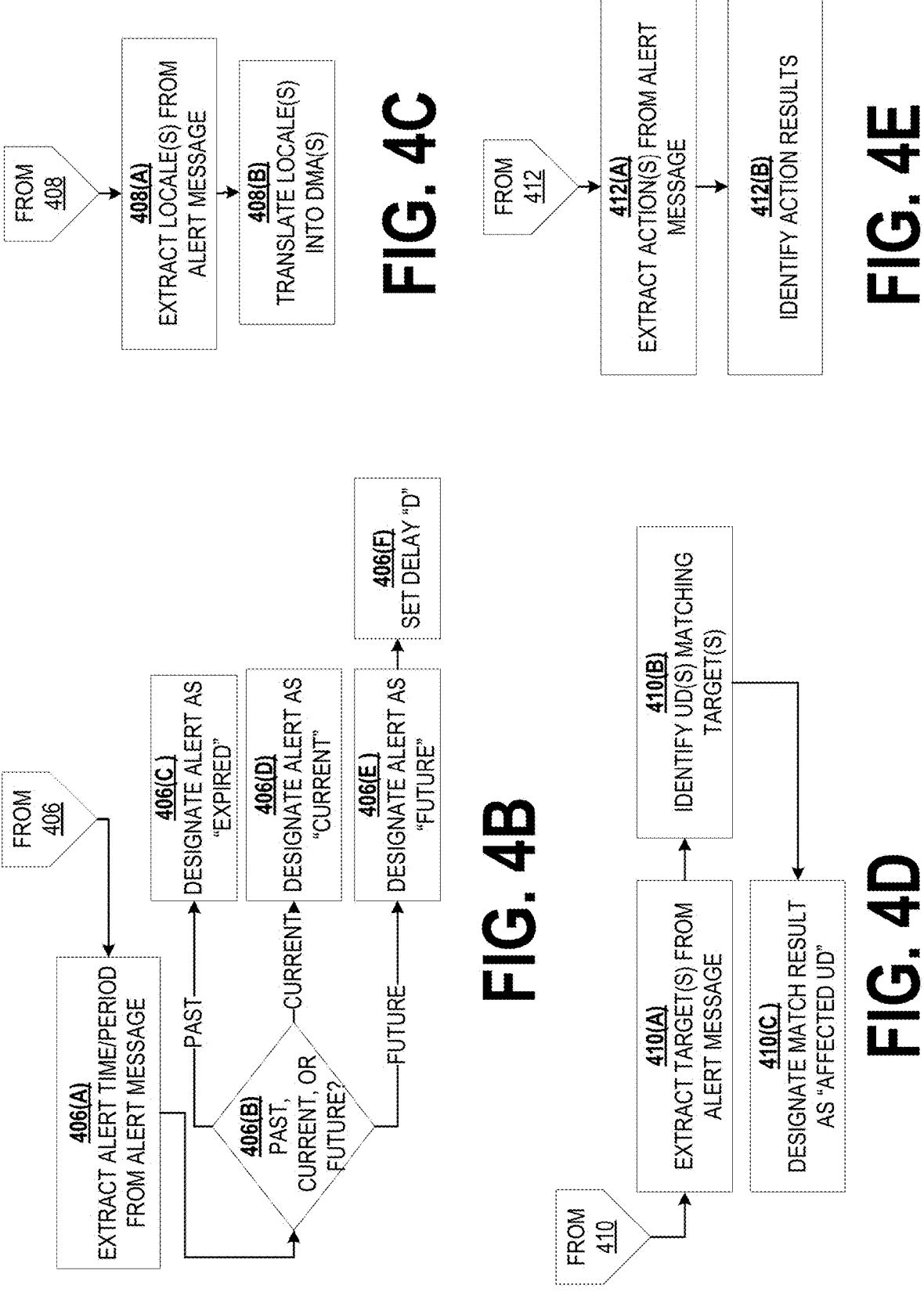

FROM
408

408(A)
EXTRACT LOCALE(S) FROM
ALERT MESSAGE

408(B)
TRANSLATE LOCALE(S)
INTO DMA(S)

FIG. 4C

FROM
412

412(A)
EXTRACT ACTION(S) FROM ALERT
MESSAGE

412(B)
IDENTIFY ACTION RESULTS

FIG. 4E

FROM
406

406(A)
EXTRACT ALERT TIME/PERIOD
FROM ALERT MESSAGE

406(B)
PAST,
CURRENT, OR
FUTURE?

PAST

406(C)
DESIGNATE ALERT AS
"EXPIRED"

CURRENT

406(D)
DESIGNATE ALERT AS
"CURRENT"

FUTURE

406(E)
DESIGNATE ALERT AS
"FUTURE"

406(F)
SET DELAY "D"

FIG. 4B

FROM
410

410(A)
EXTRACT TARGET(S) FROM
ALERT MESSAGE

410(B)
IDENTIFY UD(S) MATCHING
TARGET(S)

410(C)
DESIGNATE MATCH RESULT
AS "AFFECTED UD"

FIG. 4D

LOCAL ALERTS ON NON-LOCAL CHANNELS

CROSS-REFERENCE TO RELATED APPLICATIONS

This application claims priority to and is a Continuation application of U.S. patent application Ser. No. 17/954,078, filed on 27 Sep. 2022, in the name of inventors Eric Pleiman and Joseph Tomko, entitled "Local Alerts on Non-Local Channels", and which issued as U.S. Pat. No. 12,149,595 on 19 Nov. 2025—the entire contents of which are incorporated herein by reference.

TECHNICAL FIELD

The technology described herein generally relates to devices, systems, and processes for presenting national weather service alerts, emergency broadcast services alerts, and other forms of localized alerts on non-local audio-video channels.

BACKGROUND

In the United States, various forms of alert messages are generated by governmental authorities and communicated to user devices using third party communications systems providers, such as local radio and television broadcast stations, wireless communications systems operators, and the like. An alert informs recipients of incidents that are occurring, may occur soon, or could occur. Non-limiting forms of alerts include weather alerts, AMBER alerts, and the like.

Commonly, users do not receive a weather alert if they are not then receiving and watching a local broadcast radio or television (herein, collectively "television") channel, where the channel has voluntarily agreed to present the alert to their viewers and provides timely updates of such alerts (when an update is available). User not tuned to a local television channel or tuned to a non-local channel, with non-limiting examples including HBO™ (providing a/v programming), SPOTIFY™ (providing audio streaming), NETFLIX™ (providing video streaming), or the like will not receive the alert. Herein, a "local channel" refers to any a/v channel that is broadcast to users within range of or capable of receiving radio frequency signals. Further, users not currently receiving a local channel, e.g., when their user devices, while in a "active mode" are not then configured to receive a local channel signal—such as when configured in a low-power, non-operative application, or similar mode of operation (herein, a "standby mode"), will also not receive a given alert.

Thus, a need exists to provide such alerts to users receiving non-local channels and to users whose user devices are currently powered off or otherwise not then configured to receive an alert. The various implementations and implementations described herein provide devices, systems and processes which address the above and other concerns.

SUMMARY

The various implementations described herein provide devices, systems, and processes for providing alerts to users viewing non-local television, streaming, and other A/V channels and to users whose user devices are not presently configured to receive an alert due to the device being in a standby, or similar mode of operation.

In accordance with at least one implementation of the present disclosure, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including computer instructions that, when executed by data processing apparatus, cause the apparatus to perform the actions.

For at least one implementation of the present disclosure, a process includes receiving, by a content distributor system, an alert message. The alert message includes a first alert condition and a second alert condition. The process may also include identifying, in the alert message, the first alert condition and the second alert condition, generating an alert notice based on the first alert condition and the second alert condition and transmitting the alert notice to a user device coupled to the content distributor system. Other implementations may include corresponding computer systems, apparatus, and computer programs recorded on one or more computer storage devices, each configured to perform the actions of the process.

For at least one implementation, the process may include one or more of the following features. The first alert condition may specify an alert type. The second alert condition may specify a time period. The alert message may include a third alert condition specifying an action for a user of the user device to take or refrain from taking during the time period. The alert notice may further identify the action. The alert message further may include a target condition. The alert notice may inform the user device of the action to be performed, during the time period, while the target condition is satisfied.

For at least one implementation, the first alert condition specifies a type condition. The type condition may be one of a warning, a watch, an advisory, or otherwise. The process may include determining, when a type condition for a previously received alert message specifies a watch or an advisory, whether the alert notice upgrades the type condition to a warning. The process may include taking no further actions if the alert notice does not upgrade the type condition to a warning after a given period. The process may include identifying, in the alert notice, at least one action for a user of the user device to perform when the alert notice upgrades the type condition to a warning.

For at least one implementation, the second alert condition may specify a time condition. For at least one implementation, the alert message may include a third alert condition. The third alert condition may identify a first locale. The process further may include: identifying, in the alert message, the third alert condition, and generating a second alert notice based on the first alert condition, the second alert condition, and the third alert condition.

For an implementation, transmitting of the second alert notice to a user device further may include: determining whether the user device is, at a given time, at the first locale and transmitting the second alert notice while the user device is located at the first locale.

The second alert condition may identify a first period and the process further may include determining whether the user device will be at the first locale during at least part of the first period. If affirmative, the process may include transmitting the second alert notice to the user device. If negative, the process may include not transmitting the second alert notice to the user device. Implementations of the described techniques may include hardware, a method or process, or computer software on a computer-accessible medium.

For at least one implementation, a server configured for providing local alerts to a user device includes a server processor and a server data store. The server data store is a computer readable medium and contains non-transient computer instructions which, when executed by the server processor, instantiate a server alert engine and configure the server to perform alert operations that may include receiving an alert message from an alert authority coupled to the server. The alert message may include a first alert condition and a second alert condition. The server may first identify the first alert condition in the alert message and first determine, based on the first alert condition, whether to generate an alert notice. When the first determining returns a negative result, the server may take no further action. When the first determining yields a positive result, the server may second identify the second alert condition in the alert message, and second determine, based on the second alert condition, whether to further generate the alert notice. The server may take no further action when the second determining returns a negative result. When the second determining yields a positive result, the server may generate an alert notice based on the first alert condition and the second alert condition. The alert notice may instruct the user device to perform operation including: configuring the user device, when in a standby mode, into an active mode; and presenting, via a non-local channel, an alert for an incident to a user of the user device. Other implementations may include corresponding computer systems, apparatus, and computer programs recorded on one or more computer storage devices, each configured to perform the actions of the methods.

For at least one implementation, the server is a content distributor server. The alert operations further may include: receiving the alert message, by the server, via at least one of: directly from the alert authority; indirectly from the alert authority via an integrated public alert & warning system (IPAWS); indirectly from the alert authority via a broadcast system; and indirectly from the alert authority via a wireless communications system.

For at least one implementation, the first alert condition may specify an alert type, and the first determining yields a positive result when the alert type is a warning. For at least one implementation, the second alert condition may identify a time period and the second determining yields a positive result when a current time occurs within the time period.

For at least one implementation, the alert message may include a third alert condition and the alert operations further may include: third determining whether to generate the alert notice based on the first alert condition, the second alert condition, and the third alert condition. The first alert condition may identify an alert type, the second alert condition may identify a time period, and the third alert condition may identify a locale.

For at least one implementation, the alert message may include a fourth alert condition identifying a target. The alert notice may be generated when the alert type is a warning, a current time occurs within the time period, and a current location of the user device will be within the locale during the time period.

For at least one implementation, the alert message include a fourth alert condition which identifies a target condition. The alert notice is generated when the user device satisfies the target condition.

For at least one implementation, the server data store further contains second non-transient computer instructions providing local alerts to a user device by instantiating a server connection engine which, when executed by the server processor, configures the server to perform connection operations that may include: identifying a current location of the user device; determining a first coupling available between the server and the user device at the current location; and transmitting, via the first coupling, the alert notice to the user device while the user device is at the current location. The first alert condition may include a type condition, the second alert condition may include a time condition during which the type condition is active, and the alert message may include a location condition. The user device may be a mobile device and the connection operations further may include third determining a future location of the user device, fourth determining whether the location condition corresponds to at least one the current location of the user device, the future location of the user device, or a location between the current location and the future location to be traversed by the user device during the time condition, and if the fourth determining is affirmative, communicating the alert notice to the user device.

For at least one implementation, the alert message may include an action condition and the alert notice may instruct the user to take or refrain from taking one or more actions specified by the action condition. Implementations of the described techniques may include hardware, a method or process, or computer software on a computer-accessible medium.

For at least one implementation, a computer readable medium containing non-transient computer instructions which instruct a server to perform operations including first instantiating a server alert engine performing alert operations and second instantiating a server connectivity engine performing connectivity operations. The operations may be performed, for at least one implementation, when a user device is not coupled to a local channel when an alert message communicating the local alert is generated by an alert authority. The instructions may include receiving the alert message. The alert message may include a first alert condition identifying an alert type, a second alert condition identifying a time period, and a third alert condition identifying at least one locale. The instructions may include first identifying the alert type, second identifying the time period, third identifying the locale, and generating an alert notice based on the alert type, time period and locale. The alert notice may instruct the user device to perform operations including presenting, via a non-local channel, an alert for an incident to a user of the user device per the alert type, during the time period, and at user devices located within the locale.

For at least one implementation, the instructions may include connectivity operations which may include identifying a location of the user device, determining a coupling available between the server and the user device at the location, and transmitting the alert notice to the user device via the coupling. Other implementations may include corresponding computer systems, apparatus, and computer programs recorded on one or more computer storage devices, each configured to perform the actions of the methods.

BRIEF DESCRIPTION OF THE DRAWINGS

The features, aspects, advantages, functions, modules, and components of the devices, systems and processes provided by the various implementations of the present disclosure are further disclosed herein regarding at least one of the following descriptions and accompanying drawing figures. In the appended figures, similar components or elements of the same type may have the same reference number and may include an additional alphabetic designator, such as 108a-108n, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When the first reference label is used in the specification, the description is applicable to any of the similar components and/or views having the same first reference number irrespective of any additional alphabetic designators or second reference labels, if any.

FIGS. 4 and 4A-4E are flow charts representing a process for generating from a received alert and alert notice for transmission to, and presentation by, one or more user devices and in accordance with at least one implementation of the present disclosure.

DETAILED DESCRIPTION

Figure 1:
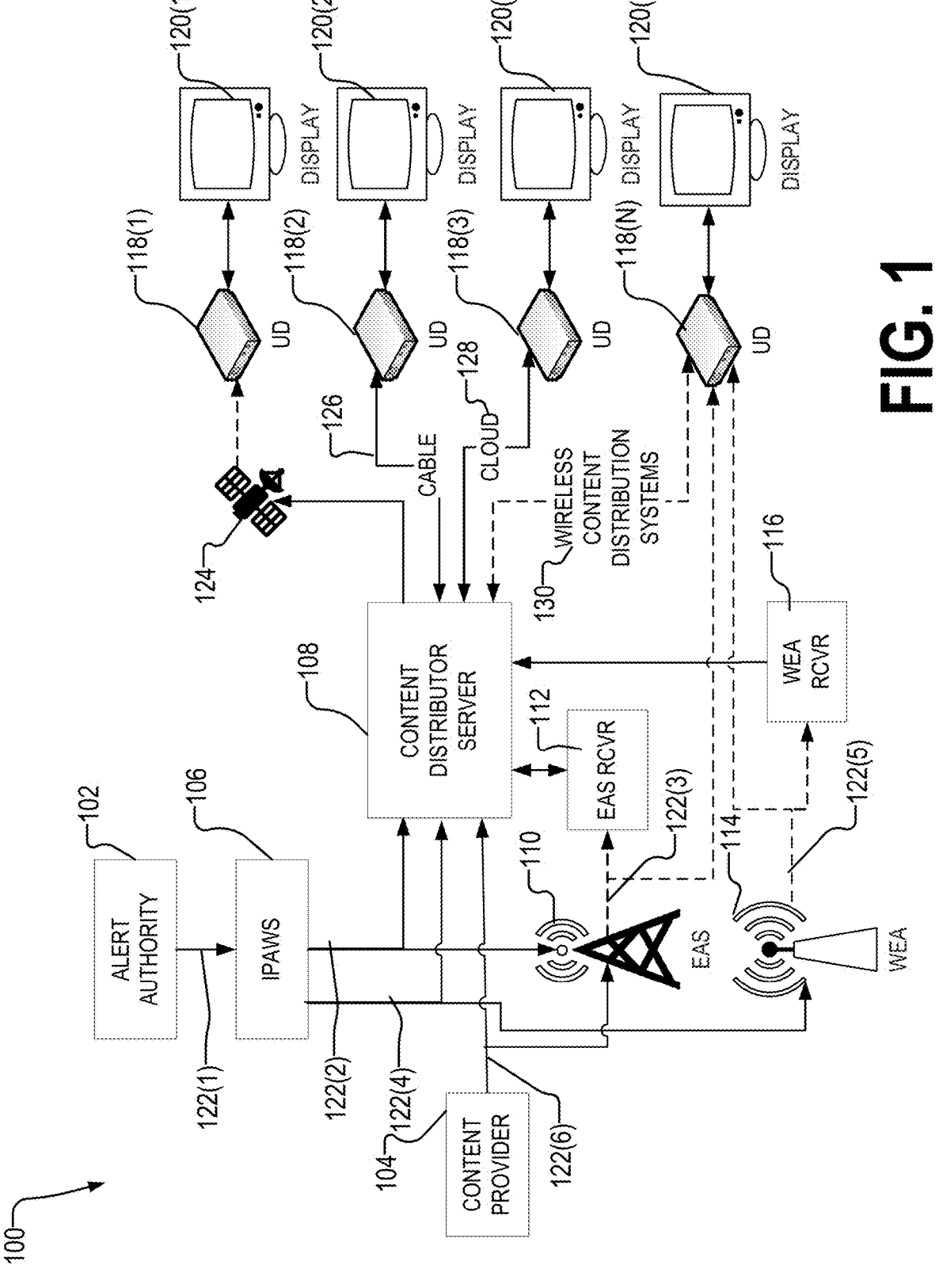
FIG. 1 is a schematic representation of a system for presenting local alerts on non-local channels and/or on user devices in a standby mode of operation and in accordance with at least one implementation of the present disclosure.

Various implementations of the present disclosure describe devices, systems, and processes for providing local alerts on non-local channel content feeds.

"Data" (which is also referred to herein as a "computer data" and "data packet(s)") refers to any representation of facts, information, or concepts in a form suitable for processing by one or more electronic device processors and which, while and/or upon being processed, cause or result in an electronic device or other device to perform at least one function, task, operation, provide a result, or otherwise. Data may exist in a transient and/or non-transient form, as determined by any given use of the data.

"Instruction" (which is also referred to herein as a "computer instruction") refers to a non-transient processor executable instruction, associated data structure, sequence of operations, program modules, or the like. An instruction is defined by an instruction set. It is commonly appreciated that instruction sets are often processor specific and accordingly an instruction may be executed by a processor in an assembly language or machine language format that is translated from a higher level programming language. An instruction may be provided using any form of known or later arising programming; non-limiting examples including declarative programming, imperative programming, functional programming, procedural programming, stack based programming, object-oriented programming, and otherwise.

"Processor" refers to one or more known or later developed hardware processors and/or processor systems configured to execute one or more computer instructions, with respect to one or more instances of data, and perform one or more logical operations. The computer instructions may include instructions for executing one or more applications, software engines, and/or processes configured to perform computer executable operations. Such hardware and computer instructions may arise in any computing configuration including, but not limited to, local, remote, distributed, blade, virtual, or other configurations and/or system configurations. Non-limiting examples of processors include discrete analog and/or digital components that are integrated on a printed circuit board, as a system on a chip (SOC), or otherwise; Application specific integrated circuits (ASICs); field programmable gate array (FPGA) devices; digital signal processors; general purpose processors such as 32-bit and 64-bit central processing units; multi-core ARM based processors; microprocessors, microcontrollers; and the like. Processors may be implemented in single or parallel or other implementation structures, including distributed, Cloud based, and otherwise.

A "computer engine" (or "engine") refers to a combination of a "processor" and "computer instruction(s)." A computer engine executes computer instructions to perform one or more logical operations (herein, a "logic") which facilitate various actual (non-logical) and tangible features and functions provided, in whole or in part, by an electronic device.

"Substantially simultaneous(ly)" means without incurring a greater than expected and humanly perceptible delay between a first event or condition and second event or condition. Substantial simultaneity may vary in a range of quickest to slowest expected delay to a longer delay. It is to be appreciated that the subject and acceptable threshold of "substantial simultaneity" may include considerations of distance, data processing capabilities and/or data communication capabilities. For example, content provided in data packets over gigabit Ethernet capable local area network (LAN) connections may have a shorter acceptable delay period (and a more stringent substantially simultaneous delay period) than content presented over a 3G network, where data communications are knowingly slower and thus a given (longer) delay period may satisfy a subject substantially simultaneous threshold.

"Cloud" refers to cloud computing, cloud storage, cloud communications, and/or other technology resources which a given user does not actively manage or provide. A usage of a Cloud resource may be private (limited to certain users and/or uses), public (available for users and/or uses), hybrid, dedicated, non-dedicated, or otherwise. It is to be appreciated that implementations of the present disclosure may use Cloud resources to provide for processing, storage and other functions related to facilitating live cell phone watch parties.

"Module" recites definite structure for an electrical/electronic device that is configured to provide at least one feature and/or output signal and/or perform at least one function including the features, output signals and functions described herein. A module may provide one or more functions using computer engines, processors, computer instructions and the like. When a feature, output signal and/or function is provided, in whole or in part, using a processor, one more software components may be used, and a given module may include a processor configured to execute computer instructions. A person of ordinary skill in the art (a "POSITA") will appreciate that the specific hardware and/or computer instructions used for a given implementation will depend upon the functions to be accomplished by a given module. Likewise, a POSITA will appreciate that such computer instructions may be provided in firmware, as embedded software, provided in a remote and/or local data store, accessed from other sources on an as provided basis, or otherwise. Any known or later arising technologies may be used to provide a given module and the features and functions supported therein.

"Device" refers to an electronic device configured to communicate data to and/or from a destination using a wireless communications technology. A device may include and/or be communicatively coupled to one or presentation devices, such as a display device, audible output device, or otherwise. Non-limiting examples of devices include smart phones, smart televisions, tablet computing devices, lap-top computers, desk-top computers, gaming consoles, cable/satellite set-top-boxes (STB), 10-Foot presentation devices, Internet-of-Things ("IoT") devices, and the like. For at least one implementation, a device utilizes a wireless communications technology service provided by a Mobile Network Operator ("MNO"). A non-limiting list of MNOs include DISH Network, A&T, Verizon, T-Mobile in the United States and other MNOs worldwide, such as ORANGE, TELEKOM, O2, VODAFONE, and others.

An "Application" is a set of computer instructions that configure a processor perform one or more tasks that are other than tasks commonly associated with the operation of the processor itself (e.g., a "system software," an example being an operating system software), or the providing one or more utilities provided by a device (e.g., a "utility software," an example being a print utility). An application may be bundled with a given device or published separately. Non-limiting examples of applications include word processing applications (e.g., Microsoft WORD™), video streaming applications (e.g., SLINGTV™), video conferencing applications (e.g., ZOOM™), gaming applications (e.g., FORT-NITE™), and the like.

"Coupling" refers to establishment of a communications link between two or more elements of a given system. A coupling may utilize any known and/or later arising communications and/or networking technologies, standards, protocols or otherwise. Non-limiting examples of such technologies include packet switch and circuit switched communications technologies, such as and without limitation, Wide Area Networks (WAN), such as the Internet, Local Area Networks (LAN), Public Switched Telephone Networks (PSTN), Plain Old Telephone Service (POTS), cellular communications networks such as a 3G/4G/5G or other cellular network, IoT networks, Cloud based networks, private networks, public networks, or otherwise. One or more communications and networking standards and/or protocols may be used including, without limitation, the TCP/IP suite of protocols, the Extensible Message and Presence Protocol (XMPP), VOIP, Ethernet, Wi-Fi, CDMA, Z-WAVE, Near Field Communications (NFC), GSM/GRPS, TDMA/EDGE, EV/DO, WiMAX, SDR, LTE, MPEG, and others. A coupling may include use of physical data processing and communication components. A coupling may be physically and/or virtually instantiated. Non-limiting examples of physical network components include data processing and communications components including computer servers, blade servers, switches, routers, encryption components, decryption components, and other data security components, data storage and warehousing components, and otherwise. Any known or later arising physical and/or virtual data processing and/or communications components may be utilized for a given coupling.

As used herein, an "alert" is an identification of an occurring, potentially occurring or possibly incurring "incident." An alert is initiated by an alert authority and is commonly transmitted as an "alert message" (as described herein) to two or more users and identifies at least one "alert condition" (as described herein).

An "incident" is any event that may cause injury, death, and/or damage to animate objects and/or property.

An "alert condition" identifies with respect to an incident one or more of: a type of alert (e.g., warning, watch, advisory, or the like); time and/or time period; one or more locations and/or geographic area(s); one or more intended targets for the alert; one or more to be taken or not taken by the users; and/or other information deemed by the alerting authority for communication to the two or more users. An alert condition may vary and/or change over time, for example, an affected geographic area for a tornado warning may change as a storm travels across the Earth.

An alert condition may be for an actual, potential, or anticipated weather related event. For example, the United States' National Oceanic & Atmospheric Administration (NOAA) administers that National Weather Service (NWS). The NWS provides weather, water and climate forecasts, advisories, watches, and warnings throughout the United States, its territories, adjacent waters and the like. Warnings are issued when weather conditions present a current or future threat to life or property. Non-limiting examples of types of warnings include severe winter weather warnings and advisories, flashflood and tornado warnings, hurricane warnings, and the like. A Warning may be issued for an immediate threat, such as a tornado, or a developing threat, such as a hurricane approaching a landmass. Further, a warning may be of a highly localized area (e.g., a tornado warning issued for a city, county, town, or other geographic area of less than ten to fifty square miles), a region (e.g., a hurricane warning for a portion of the U.S. coastline, such as New Orleans, LA area), for multiple regions (e.g., a winter weather warning extending across multiple states), or national (e.g., a solar flare warning potentially disrupting communications across the U.S. landmass).

To notify the relevant public of a given warning, the NWS use various communications system including the U.S. Emergency Alert System (EAS), Wireless Emergency Alerts (WEA) system, the Integrated Public Alert & Warning System (IPAWS), which is operated by the Federal Emergency Management Agency (FEMA), NOAA Weather Radio (NWR), NOAA Weather Wire Service (NWWS), Emergency Managers Weather Information Network (EMWIN), Interactive Weather Information Network (IWIN), and NOAAPORT. State and local authorities may use the EAS to deliver, as alert data, emergency information. Non-limiting examples include weather alerts, AMBER alerts, and the like. EAS messages are commonly communicated using broadcast television and radio signals.

The EAS messages are commonly communicated using IPAWS and one or more "intermediaries." Non-limiting examples of EAS intermediaries include local radio and television broadcasters, cable and satellite systems, and the like.

Similarly, WEA messages may also be communicated as alerts to users' wireless devices. WEA messages may be sent using IPAWS and intermediaries such as wireless communication systems provided by cellular and/or mobile services providers. WEA messages are commonly communicated in a text message format.

An "alert message" is a transmission of an alert from an "alert authority" to at least one "recipient" (as described herein). Herein, "alert message" includes, and is not limited to, EAS messages, WEA messages, and other message forms. An alert message may be transmitted to one or more "recipients" by broadcast (e.g., where a broadcast signal is intended for receipt by any recipient within an alert area), multicast (e.g., communicated to two or more recipients within an alert area), simulcast (e.g., communicated via multiple transmission mediums to one or more recipients), unicast (e.g., communicated to a specific designated recipients), and/or using other known or later arising communications topologies.

An "alert notice" is a transmission, by a content distributor server (as described below) and to at least one user device (as described below), of data provided in an alert message. An alert notice may include data provided in an alert message. For at least one implementation, an alert notice may include additional data than that provided in an alert message. The data provided in an alert notice may be formatted for presentation to a user as "alert information" and in a humanly perceptible format.

A "recipient" is any device configured to receive an alert message. Non-limiting examples of a recipient include a "user device" Other non-limiting examples of recipients include, an IPAWs, and a content distributor server (as described below). A recipient may act as an intermediary, gatekeeper, or otherwise of alert messages transmitted by an alert authority and further provided, as an "alert notice" to a user device.

A "user" is an animated object such as a human or artificial intelligence entity, e.g., a humanoid).

A "user device" is a device, associated with a user, configured to receive, process and present alert data to one or more "users" in a humanly perceptible format as "alert information."

As shown and described in Appendix 1 (which is incorporated herein in its entirety), alert messages are generated by authorized entities (herein, an alert authority) and distributed, per IPAWS, using various communications mechanisms including EAS, WEA, and the Internet. As described on page 37 of Appendix 1, EAS messages interrupt local television and radio broadcast feeds, but are not provided otherwise. Accordingly, to timely receive an EAS message, a user is actively receiving (and watching/listening) to a local radio or television broadcast station's audio-video (A/V) feed.

If a user is watching another channel, such as a national channel like ESPN™ or HBO™, the user will not be presented with the EAS message. As further described, an EAS message commonly interrupts a program once, with the alert message being repeated twice before disappearing. As further described on page 39 of Appendix 1, WEA messages are targeted based on cell tower locations. If a given location is not within range of a cell tower, the WEA message will not be communicated to the given location.

A "warning" is a type of alert message that indicates that an incident is occurring within a given area and typically within a given time period. A warning may instruct a recipient to respond on an "emergency," "immediate," "red flag," "critical," or similar basis. A non-limiting example of a warning is a tornado warning, which indicates that a tornado has been detected (e.g., by radar, human observation, or otherwise).

A "given environment" refers to a combination of a type of alert and a time or period identified (which may include an indefinite period) for alert message. As described below and for at least one implementation, a given environment may additionally, and/or alternatively describe one or more other alert conditions, and/or combinations and permutations of alert conditions.

A "watch" is a type of alert message that indicates that a given environment has a potential for a given incident (e.g., a tornado) to occur. A non-limiting example of a "watch" is a "tornado watch" where the Earth's environment supports the potential formation of a tornado within a given environment, but existence of a tornado has not yet been determined.

An "advisory" is a type of alert message that indicates that a given environment may experience an incident in a given future period, but a more precise determination of whether the incident will actually occur within the given environment has not been made. A non-limiting example of an "advisory" is a hurricane advisory indicating that a hurricane is forming or has formed (e.g., in the Atlantic) but where/if the hurricane will make landfall (e.g., in Florida, the Gulf Coast, or otherwise) is currently unknown and not predicted at or above a given confidence level, e.g., greater than fifty percent (50%) probability.

As shown in FIG. 1, a system 100 for providing alerts on non-local channels to users may include at least one alert authority 102, one or more content providers 104, an IPAWS 106, a content distributor server 108, a radio/tv broadcast system 110 capable of transmitting EAS messages, an EAS receiver 112, a wireless communications system 114 capable of transmitting WEA messages, a WEA receiver 116, and one or more user devices ("UDs") 118, such as UDs 118(1) to 118(N), where "N" is an integer. The UDs 118 may include or be coupled to one or more displays 120 (for video signals), speakers or the like (for audio signals), or other user interfaces (herein, commonly referred to as a "display" 120), such as displays 120(1) to 120(N).

As further shown in FIG. 1, an alert authority 102 may be coupled by a first link 122(1) with an IPAWS 106. A given link 112, as used herein, may use any known or later arising coupling(s) to facilitate the communication of data between two or more components of system 100.

A system 100 may include multiple alert authorities, for example, the NWS may provide weather alerts, a local or regional emergency services department may provide AMBER alerts, and a local, regional, or state transportation department may provide road condition alerts. An alert authority may be any entity permitted by a government or other authority to issue alerts.

EAS Messages

An alert authority may generate EAS messages 102 and transmit the EAS messages to one or more recipients as an alert message. For at least one implementation, a recipient may include a UD 118 and/or an EAS receiver 112.

For at one implementation, a recipient may include at least one IPAWS 106. The IPAWS 106 may be configured to receive an alert message from an alert authority and provide the alert message to a broadcast system 110 transmission to UDs 118 in an EAS message format and/or to a content distributor system 108 for transmission to UDs 118 as an alert notice.

EAS message transmissions may vary based on one or more conditions, for example by geography, such as locally, regionally, statewide, nationally, by user group or type of user, such as high wind alerts for over the highway trucks and other high wind exposure vehicles, and otherwise. An alert authority 102 may designate to an IPAWS 106 one or more alert conditions for a given alert, such as local conditions, time conditions, user device conditions, and otherwise. It is to be appreciated that an EAS message format may be specified by one or more governmental authorities and such EAS message format may be standardized with respect to one or more areas, message types, or otherwise. As used herein, an EAS message is one form of an alert message.

The IPAWS 106 may communicate EAS messages, as alert messages, to one or more broadcast systems 110 using one or more second links 122(2). For at least one implementation, the one or more second links 122(2) may couple an IPAWS 106 with a content distributor server 108 thereby facilitating communication of EAS messages directly to the content distributor server 108. Aa broadcast system 110 may use one or more third links 122(3) to output radio frequency (RF) signals that include EAS messages. The one or more EAS messages may be received by EAS receivers 112, UDs (e.g., an Nth UD 118(N)), or otherwise.

For at least one implementation, a broadcast system 110 may be configured to receive an alert message directly (e.g., without using an IPAWS 106—not shown in FIG. 1) or indirectly (e.g., via an IPAWS 106) from an alert authority 102.

Upon receipt by a broadcast system 110, an EAS message may be reformatted or otherwise processed and transmitted, via one or more third links 122(3), as an EAS message to one or more recipients. For at least one implementation, the third link 122(3) may utilize a radio frequency (RF) signal, an Internet compatible signal, or otherwise. The third link 122(3) may be used to communicate EAS messages separately and/or in conjunction with other forms of data including radio signals, television signals, and other forms of content provided by a content provider 104 using one or more sixth links 122(6). Content provided by a given content provider 104 may also be and/or alternatively communicated to a content distributor server 108 using one or more sixth links 122(6).

For at least one implementation, a link 122 may utilize any known or later arising technologies to facilitate the communication of EAS messages, directly or indirectly, to one or more user devices 118. For at least one implementation, an EAS message may be embedded into line 22 of a broadcast television stream, provided in one more Motion Pictures Expert Group (MPEG™) data packets transmitted by the broadcast system 110, provided in an Internet compatible data packet, such as in an HTTP, FTP or other known or later arising format, provided in a text message or other cellular data format, or otherwise transmitted by the broadcast system 110 and/or wireless communications system 114.

Any known or later arising technologies may be utilized to transmit an EAS message directly to one or more UDs 118. The UD(s) 118 may present information extracted from the received EAS message to at least one user using a display 120.

For at least one implementation, a content distributor server 108 may include and/or be coupled to an EAS receiver 112 configured to receive EAS messages transmitted by a broadcast system 110.

WEA Messages

For at least one implementation, an alert message may be communicated as a WEA message to one or more wireless communications systems 110 using one or more fourth links 122(4). The one or more fourth links 122(4) may couple an IPAWS 106 with a content distributor server 108 thereby facilitating communication of WEA messages directly to the content distributor server 108. As used herein, a WEA message is one form of an alert message.

As further shown, a broadcast system 110 may use one or more fifth links 122(5) to output radio frequency (RF) signals that include WEA messages. The one or more WEA messages may be received by WEA receivers 116, UDs 118 (e.g., an Nth UD 118(N)), or otherwise.

For at least one implementation, a wireless communications system 114 may be configured to receive an alert message directly (e.g., without using an IPAWS 106—not shown in FIG. 1) or indirectly (e.g., via an IPAWS 106) from an alert authority 102.

Upon receipt by a wireless communications system 114, an alert message may be reformatted (if received in another, non-WEA message format) and transmitted in a WEA message (or other format) by the wireless communications system 114 to one or more recipients using one or more fifth links 122(5). For at least one implementation, a recipient may include a UD 118 and/or a WEA receiver 116. For at least one implementation, the fifth link 122(5) may utilize one or more of a radio frequency (RF) signal, an Internet compatible signal, a cellular signal, or other signal. The fifth link 122(5) may be used to communicate WEA messages separately and/or in conjunction with other forms of data including radio signals, television signals, and other forms of content provided by a content provider 104, or others, using one or more sixth links 122(6).

The fifth link 122(6) may utilize any known or later arising technologies to facilitate the communication of WEA messages to one or more recipients. A WEA message may be communicated directly or indirectly (e.g., via one or more intermediary systems, such as one or more content distributors 108) to one or more UDs 118. Any known or later arising technologies may be utilized to communicate an alert message, separately and/or in a WEA message format, to one or more UDs 118. The UD(s) 118 may present information extracted from the received WEA message to at least one user using a display 120.

For at least one implementation, a content distributor server 108 may include and/or be coupled to a WEA receiver 116 configured to receive WEA messages transmitted by a wireless communications system 114.

Alert Notices

A content distributor server 108 may communicate data received in an alert message as an alert notice to one or more UDs 118. The content distributor system 108 may be coupled to the UDs 118 using any known or later arising coupling(s). For at least one implementation, a content distributor server 108 may utilize satellite communications links 124 to communicate an alert notice to one or more UDs 118. Non-limiting examples of satellite communications links include those provided by DIRECTV™, DISH™, STARLINK™, INTELSAT™, and others.

For at least one implementation, a content distributor server 108 may utilize cable communications links 124 to communicate an alert notice to one or more UDs 118. Non-limiting examples of cable communications links include those provided by COMCAST™, COX™, and others.

For at least one implementation, a content distributor server 108 may utilize Cloud and/or Internet based communications links 124 to communicate an alert notice to one or more UDs 118. Non-limiting examples of Cloud based communications links include those provided by Google FIBER™, RINGCENTRAL™, and others.

For at least one implementation, a content distributor server 108 may utilize wireless (also known as "cellular") communications links 124 to communicate an alert notice to one or more UDs 118. Non-limiting examples of wireless communications links include those provided by DISH™, T-MOBILE™, VERIZON™, AT&T™, and others.

User device 118 may include or be coupled to a display 120, via which information provided in an alert notice and/or in an alert message may be presented to a user in a humanly perceptible format. Non-limiting examples of displays 120 include televisions, displays on smartphones, tablets, and the like, speakers, car buds, smart glasses, augmented reality glasses, virtual reality goggles, and the like. Any known or later arising technologies which facilitate communication of information provided in an alert notice and/or an alert message to a user for perception thereby may be used as a display 120.

Content Distributor Server 108

Figure 2:
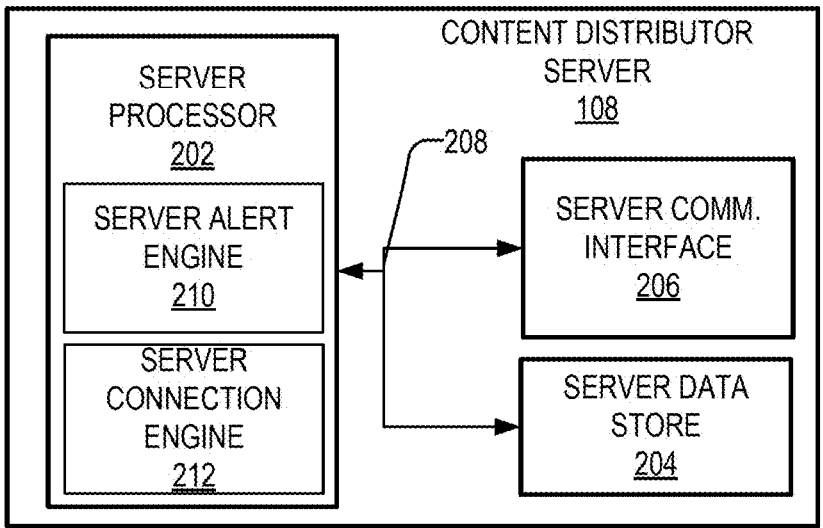
FIG. 2 is a schematic representation of a content distributor server utilized in accordance with at least one implementation of the present disclosure.

As shown in FIG. 2 and for at least one implementation of the present disclosure, a content distributor server 108 may include a server processor 202, a server data store 204, a server communications interface 206, and other commonly well-known components an electronic wireless communications and/or computing device with non-limiting (non-shown) examples including a power supply, a security module (which may be provided physically and/virtually), a user interface, one or more communications components such as antennas, amplifiers, mixers, and the like. A server bus 208 couples the various content distributor server 108 components operably together. The content distributor server 108 may be communicatively coupled, directly or indirectly, with one or more UDs 118. The content distributor server 108 may be provided in the virtual domain and/or in the physical domain. The content distributor server 108 may be associated with a user, a machine process executing on one or more computing devices, an Application Program Interface (API), a web service, instantiated on the Cloud, distributed across multiple computing devices, or otherwise. The content distributor server 108 may be any electronic device configurable to communicate data using a network, directly or indirectly, to another device, to another server, or otherwise.

Server Processor 202

The server processor 202 is herein, also identified as a server central processing unit (CPU) or "server CPU". Any known or later arising processor may be used for server processor 202. The server processor 202 may be provided by a processing device capable facilitating one or more logics by executing one more computer instructions with respect to data. The server processor 202 may include one or more physical components configured for data processing operations. Any known or later arising technologies may be utilized in conjunction with an implementation of the present disclosure to facilitate server processor 202.

The server processor 202 may execute computer instructions which instantiate a server alert engine 210 (as further described herein) and thereby performs one or more server alert processing operations which facilitate receiving alert messages, identifying one or more conditions specified therein, processing the alert data, and/or communicating one or more alert notices alerts to one or more UDs 118.

The server processor 202 may execute computer instructions which instantiate a server connection engine 212 (as further described herein) and thereby performs one or more server operations which facilitate associating a given UD 118 with one or more alert conditions in order to facilitate providing of alert notices to those UDs 118 within a given environment. For at least one implementation, a given environment may be further defined by one or more types of UD 118, or otherwise. For example, an alert message conveying information about a detected tornado may be specified for a given environment that is further defined based on geography, such as the tornado's current location and direction of travel. For another example, an alert message conveying a high-wind warning, may apply for a given environment that is further defined based on a locale (or geography), such as one or more geographic areas where high winds may be expected, and target, such as a type of UD 118 with a non-limiting example, including a high profile vehicle. For at least one implementation, a given environment may be further defined based on any given conditions, characteristics, restrictions, or otherwise.

The server processor 202 may instantiate computer engines, including the server alert engine 202 and the server connection engine 212, as one or more threads operating on a computing system having a multiple threaded operating system, such as the WINDOWS, LINUX, APPLE OS, ANDROID, and other operating systems, as an application program on a given device, as a web service, or otherwise. An Application Program Interface (API) may be used to support an implementation of the present disclosure. A computer engine may be executed by one or more threads on server processor 202, on the Cloud, or otherwise.

The server processor 202 may be communicatively coupled, by the server bus or similar structure, to other components of the content distributor server 108 including, but not limited to, the server data store 204, which may also be referred to as a "server computer readable storage medium." The server data store 204 may be configured to store data and/or computer instructions for providing data in alert messages on non-local channels and other features and functions of an implementation of the present disclosure.

Server Data Store 204

The server data store 204 may be a storage, multiple storages, or otherwise. The server data store 204 may be configured to store data, in whole or in part, in any format, including but not limited to, clear text, encrypted, uncompressed, compressed, signed, unsigned, combinations of the foregoing, packetizations, or otherwise. The server data store 204 may be provided locally with the content distributor server 108 and/or remotely, such as by a data storage service provided on the Cloud, and/or otherwise. Storage of data may be managed by a storage controller (not shown) or similar component. It is to be appreciated that such storage controller manages the storing of data and may be instantiated in one or more of the server data store 204, the server processor 202, on the Cloud, or otherwise.

Any known or later arising storage technologies may be utilized in conjunction with an implementation of the present disclosure to facilitate server data store 204. Non-limiting examples of devices that may be configured for use as server data store 204 include electrical storages, such as EEPROMs, random access memory (RAM), Flash drives, and solid-state drives, optical drives such as DVDs and CDs, magnetic storages, such as hard drive discs, magnetic drives, magnetic tapes, memory cards, such as Compact Flash (CF), Secure Digital (SD) cards, Universal Serial Bus (USB) cards, and others.

Available storage provided by the server data store 204 may be partitioned or otherwise designated by the storage controller as providing for permanent storage and temporary storage. Non-transient data, computer instructions, or other the like may be suitably stored in server data store 204. As used herein, permanent storage is distinguished from temporary storage, with the latter providing a location for temporarily storing data, variables, or other instructions used for a then arising data processing operations. A non-limiting example of a temporary storage is a memory component provided with and/or embedded onto a processor or integrated circuit provided therewith for use in performing then arising data calculations and operations. Accordingly, it is to be appreciated that a reference herein to "temporary storage" is not to be interpreted as being a reference to transient storage of data. Permanent storage and/or temporary storage may be used to store transient and non-transient computer instructions, and other data.

Server Communications Interface 206

The content distributor server 108 may include a server communications interface 206. The server communications interface 206 may be configured to use any known or later arising communications and/or networking technologies which facilitate coupling of the content distributor server 108 to other system 100 components, including but not limited to one or more UDs 118, IPAWS 106, content providers 104, EAS receivers 112, WEA receivers 116, broadcast systems 110, wireless communications systems 114, satellite systems 124, cable systems 126, the Internet and/or Cloud based content distribution systems 128, wireless content distribution systems 130, or otherwise.

One or more data ports (which are also commonly referred to an input/output interfaces, cards, or the like) may be used to facilitate coupling of the content distributor server 108 with one or more system 100 components. Such communication interfaces are well-known in the art and non-limiting examples include Ethernet cards, USB and storage medium interface cards, radio frequency transceivers, and others. For at least one implementation, the server communications interface 206 may be configured to couple with one or more antennas, such as a DBS antenna, a STAR-LINK™ ground station, a broadcast signal antenna (which may be colloquially often referred to as "rabbit ears"), and the like.

Server Alert Engine 210

With reference to the operations depicted in FIG. 4 (as further described below), the server alert engine 210 includes data and computer instructions which, when executed by a server processor 202, configures a content distributor server 200 to perform alert operations including, but not limited to: receiving alert message (e.g., EAS messages and/or WEA messages); determining one or more given environments affected by the alert message; determining one or more alter conditions specified in the alert message; identifying, based on the given environment(s) and/or the one or more alert conditions, one or more UDs 118 potentially, likely, and/or actually affected by the alert (herein, an "affected UD"); processing data provided in the alert message, as appropriate for the affected UD; and communicating an "alert notice" to the affected UDs, wherein the alert notice includes data that may be presented as alert information to a user. For at least one implementation, an alert notice may include data provided in an alert message. For an implementation, an alert notice may provide additional data to the data provided in a given alert message. For an implementation, the additional alert data may be identified, retrieved, and provided manually, using artificial intelligence and machine learning processes, or otherwise.

For a non-limiting example, an alert message may identify inclement weather for a given road segment and for a given period. These alert conditions may be interpreted by the server alert engine 210 in view of prior traffic patterns and traffic conditions to identify, in an alert notice, data identifying (to a given one or more UDs 118), an alternative route to take during a current or future arising journey. For example, an alert message identifying heavy snowfall for a given route and an expected traffic jam on a secondary route may result in the server alert engine 210 identifying a tertiary route option for a given UD 118. That is, the server alert engine 210 may utilize observations based on past traffic patterns, as observed using artificial intelligence and machine learning process, and a current alert message to provide a customized alert notice to a given one or more UDs 118.

For another non-limiting example, an alert message may be provided on a local broadcast channel, such as one provided by an ABC™, NBC™, or similar licensed broadcast local station—such local stations being designated for broadcast transmission of television signals over one or more designated market areas (DMA)—the DMA being designated by the U.S. Federal Communications Commission (FCC). Using machine learning and artificial intelligence technologies, the server alert engine 210 may be configured to determine that a given user of a given UD 118 is more likely to select a television channel for a non-local station, such as HBO™ and accordingly provide to the given UD 118, as an alert notice, data extracted from an alert message. As described below, the alert notice may be received and presented by the UD 118 to a user as a video overlay or otherwise into a presentation of the non-local station (e.g., HBO) on the given UD 118.

Server Connection Engine 212

The server connection engine 212 includes data and computer instructions which, when executed by a server processor 202, configures the content distributor server 200 to performs connectivity operations including, but not limited to: identifying a current location of a given UD 118 (such location data being herein referred to as "UD location data"); determining one or more couplings available between the content distributor server 108 and the given UD 118 at a given UD location, which may be the current location, a future location, and/or one or more location there between (such coupling data being herein referred to as "UD coupling data"); and saving the UD location data and/or UD coupling data in the server data store. It is to be appreciated that the UD coupling data for a given location of a UD may indicate that no couplings are available.

For at least one implementation, a server connection engine 212 may further configure a content distributor server 200 to perform artificial intelligence and machine learning operations including: predicting one or more future locations of a given UD 118; predicting one or more future couplings available to the given UD 118 at the one or more future location of the given UD 118; and updating the stored UD location data and/or UD coupling data.

For example, a mobile UD 118, such as a smartphone, may change its location and couplings used and/or available for use. As the UD's location changes and/or as couplings available to the UD 118 vary (e.g., such variances in couplings may occur due to network loading, prioritization, or otherwise), different alert messages may become relevant or irrelevant to a user of the UD 118. The server connection engine 212 may utilize artificial intelligence and machine learning processes to determine a current, likely, and/or future location of a given UD 118 and one or more couplings available between a given content distributor server 108 and the given UD 118 before, during and after transit of the given UD 118 from a first given location to a second (or later) future location, so as to provide relevant alerts to a user of the given UD 118.

The server connection engine 212 may save UD location data and UD coupling data in one or more data files or other structures in the server data store 204. The server connection engine 212 may update the stored UD location data and/or UD coupling data as changes to and/or deviations in prior generated data sets (for the UD location data and/or UD coupling data) occur or are predicted to occur. For a non-limiting example, updated UD location data and/or updated UD coupling data, which may include predicted changes thereto later arising, may be used in providing alerts to truckers not currently located in an alert area but later likely entering into the alert area. Accordingly, for at least one implementation, pro-active alerting of alert conditions, as provided in one or more alert messages generated by an alert authority 102, may be provided, based on UD location data, UD coupling data, in whole or in part, and/or including additional data, in one or more alert notices to UDs 118 by the content distributor server 108.

Figure 4:
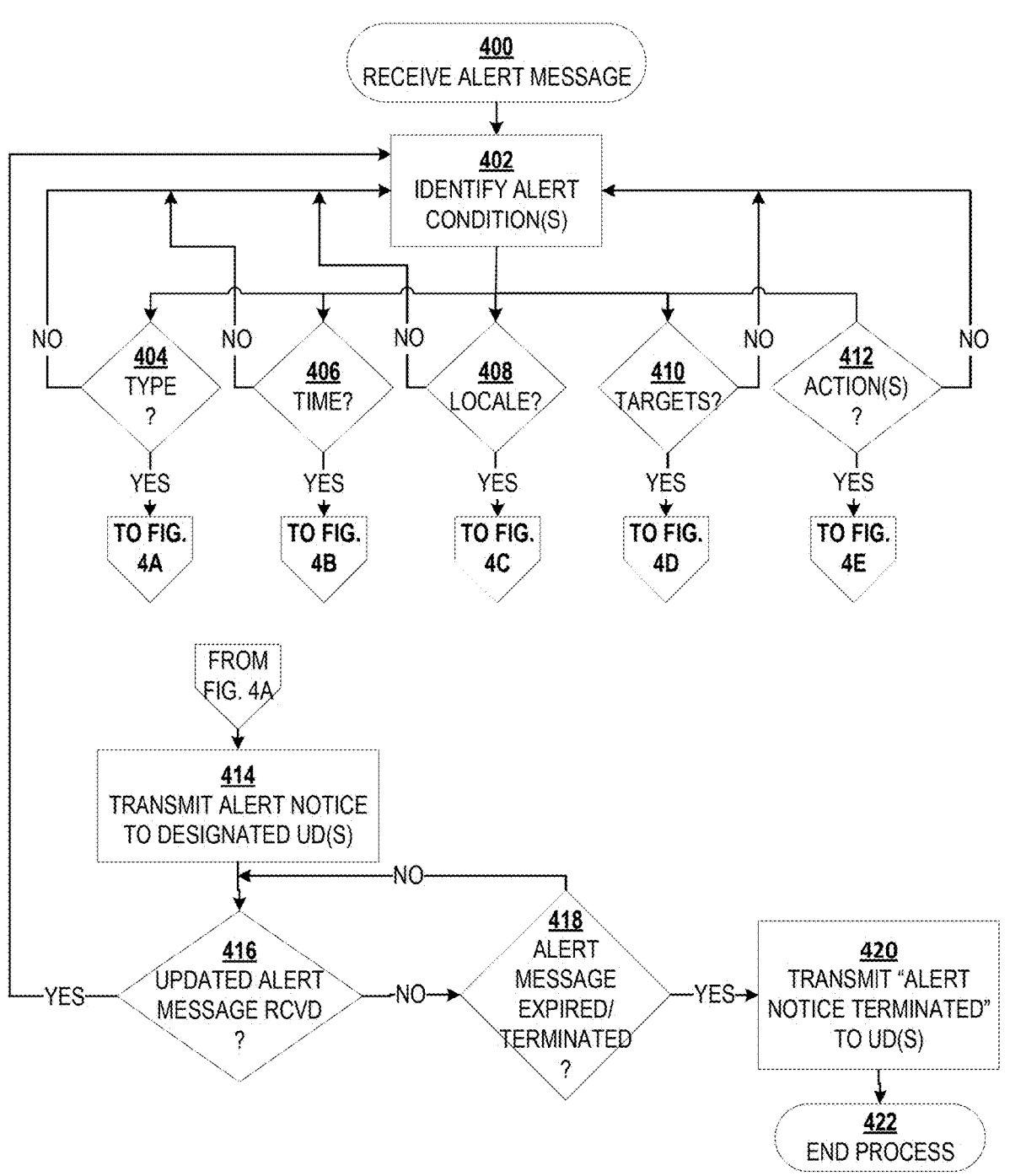

For at least one implementation, one or more operations of the server alert engine 210 and the server connection engine 212 are illustrated in the process flow shown in FIG. 4. Such operations are non-limiting and for at least one implementation of the present disclosure. Other operations, sequences thereof, combinations, and/or permutations thereof may be used in accordance with other implementations of the present disclosure.

As per Operation 400, an alert message may be received by a content distributor server 108. The alert message may be received directly from an alert authority 102, via an IPAWS 106, via an intermediary such as one provided by an Internet based server, via a broadcast system 110 and EAS receiver 112, via a wireless communications system 114 and a WEA receiver 116, or otherwise.

As per Operation 402, the server alert engine 210 examines the alert message for one or more alert conditions. As discussed above, a given alert message may include one or more alert conditions, such as a type of alert, a time or period for the alert, a locale or other area designation for the alert, one or more targets or UDs 118 potentially impacted by the environment (such as severe weather) identified in the alert, and one or more actions recommended to be taken (and/or not taken) in response to the alert (such as seeking shelter in a basement when a tornado warning is issued).

As per Operations 404-412, the server alert engine 210 may examine the alert for one or more alert conditions. The server alert engine 210 may be configured to perform the examination of two or more alert conditions in parallel, serial, or permutations thereof. The server alert engine 201 may utilize artificial intelligence and/or machine learning technologies to determine which alert conditions to examine a given alert message for based on one or more other conditions, or permutations thereof. For example, if an alert type is an advisory, which may indicate a future potential for an environment (such as severe weather) to occur, but such environment is not then occurring, the server alert engine 210 may determine to examine the alert message for time and locale but not for targets or actions. Similarly, when an alert type is a warning, which may indicate that a given environment exists that is harmful to health, safety, or property, the server alert engine 210 may determine to examine alert condition provided in a given alert message, other alert conditions provided in other alert messages (if any), other sources of data (such as current weather information), and the like. A server alert engine 210 may be perform any degree of examination of alert conditions ranging from limited to exhaustive, where an exhaustive examination may include data not provided in a given alert message itself and obtained from other data sources and/or data stores.

Figure 4A:
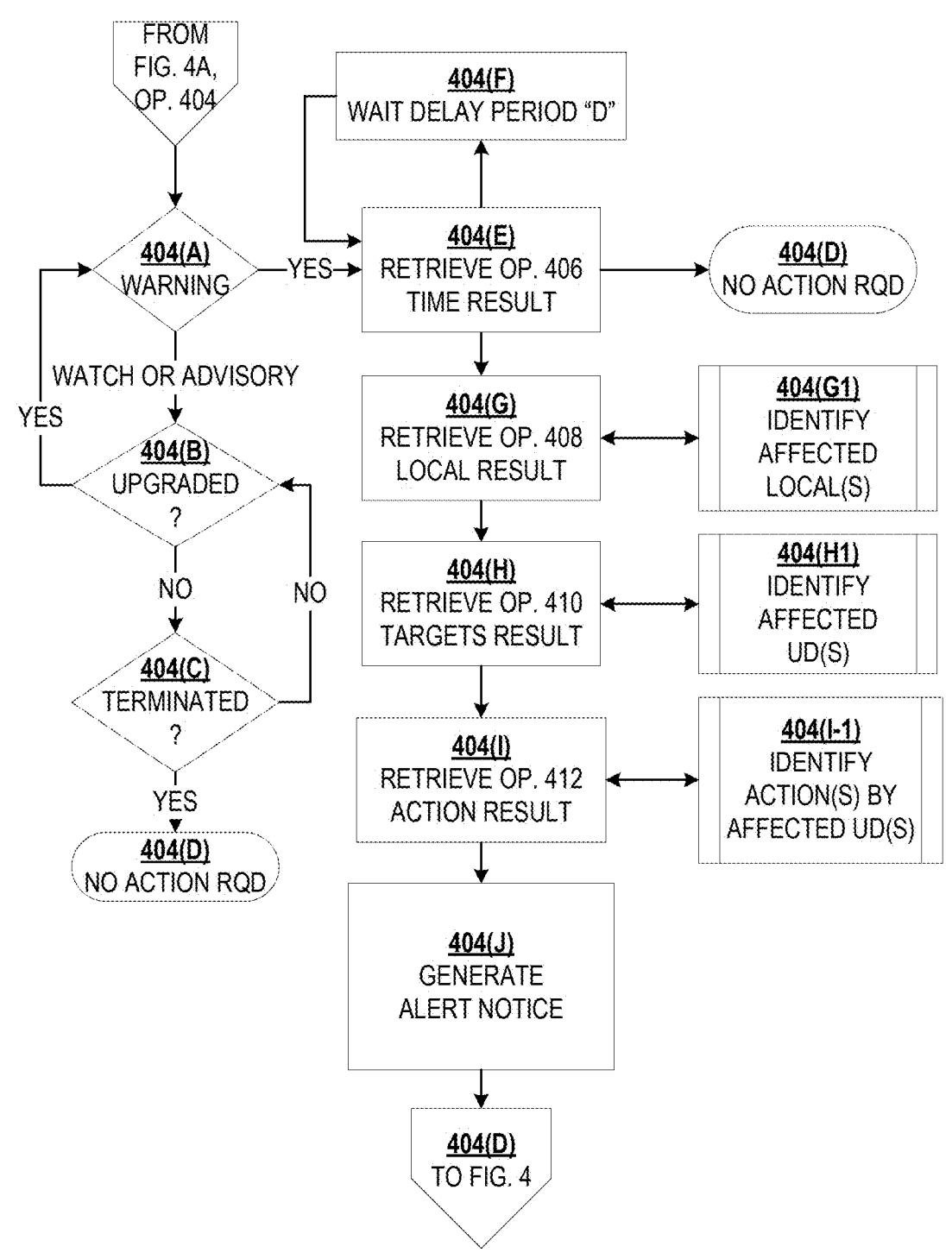

As shown in FIG. 4A, a server alert engine 210 may perform various operations when examining an alert message for an alert condition. For at least one implementation of the present disclosure, server alert engine 210 examines an alert message for a type condition. For at least one implementation, a type condition examination may provide a basis, prioritization, or the like with respect to which one or more other alert conditions are to be examined. For at least one implementation, a type condition examination is performed for a received alert message.

As shown by Operation 404A, the server alert engine 210 may determine whether the alert message specifies the type condition as a warning. As discussed above and for at least one implementation, a "warning" may be designated as the highest alert level for an incident—an alert to which immediate response may be recommended. If the alert message includes a warning type condition, the process may proceed to Operation 404E, otherwise, the alert message may be designated as having a watch or an advisory type condition.

As shown by Operation 404B, the server alert engine 210 may review alert messages to determine if they have been upgraded (or downgraded) from a prior type to a new type. Operation 404B may occur at any time, interval, frequency, or otherwise. For at least one implementation, Operation 404B may occur with respect to any given alert message that has a currently active or future active designation, as determined based on an examination of a time condition in an alert message, as per one or more Operations shown in FIG. 4B. As shown in FIG. 4A, Operations 4E-4J may be performed for alert messages having a warning type condition. Other operations, not shown, may be performed for alert messages having watch and/or advisory type conditions. It is to be appreciated that the operations performed for an alert message having a warning, watch or advisory type condition may include any combination and/or permutation of one or more operations, as provided by a given implementation of the present disclosure.

As shown by Operation 404C, the server alert engine 210 may review alert messages to determine if it has been terminated, ended, expired, withdrawn, or is otherwise no longer to be examined. Operation 404C may occur at any time, interval, frequency, or otherwise. For at least one implementation, Operation 404C may occur with respect to any given alert message that has a currently active or future active designation, as determined based on an examination of a time condition in an alert message, as per one or more Operations shown in FIG. 4B.

As shown by Operation 404D, the server alert engine 210 may end the processes of FIGS. 4 and 4A-4E for terminated alert messages.

As shown by Operation 404E, the server alert engine 210 may retrieve results from examination of one or more time conditions (if any) provided in a given alert message. Such time condition examination(s) may occur per one or more Operations 406 as shown in FIG. 4B, or otherwise.

As shown in FIG. 4B, the server alert engine 210 may perform Operations 406(A) and 406(B) and examine an alert message for one more time conditions. For at least one implementation, a time condition may be determined as designates a "past," "current," or "future" time or time period. An alert message may be periodically examined based on its time condition to determine whether to continue to be processed by the server alert engine 201 or otherwise.

As shown by Operation 406(C), for an alert message designating a "past" time, the operations may include designating the alert message as "expired." The server alert engine 210 may be configured to cease processing, archive, generate updated alert notices, or otherwise process expired alert messages.

As shown by Operation 406(D), for an alert message designating a "current" time, the server alert engine 210 may be configured to accordingly so designate the alert message and perform one or more other operations first, or at a higher priority, than may occur with respect to alert messages having "past" and/or "future" designated time conditions.

As shown by Operation 406(E), for an alert message designating a "future" time, the server alert engine 210 may be configured to designate the alert notice accordingly so, and as shown by Operation 406(F), a delay period "D" may be calculated and provided with the alert notice. The delay period may be used to identify a later time at which UD 118 is to review a given alert notice. The results of the Operations of FIG. 4B, may be utilized by the server alert engine 210 in performing one or more of the operations shown in FIG. 4A.

As shown by Operation 404(F) (in FIG. 4A) and when an alert message has been determined as designating a future time, the server alert engine 210 may be configured to wait the delay period D before proceeding or to communicate the delay period D to the UDs 118 in the alert notice. For at least one implementation, the server alert engine 210 may utilize artificial intelligence and machine learning in determining which other operations to perform for past, current, and future designated alert messages. For example, an alert message designating a future hurricane event, where responding thereto often requires various preparation efforts (e.g., boarding up windows), the delay period D may be utilized to prioritize recommended actions taken in preparation for the incident, as the delay period D decreases. For example, when a hurricane alert message indicates landfall in three (3) days, the server alert engine 210 may issue alert notices informing recipients to board up their windows. When a hurricane alert message indicates landfall in twelve (12) hours, the server alert engine 210 may issue alert notices informing recipients to evacuate. When a hurricane alert message indicates landfall is imminent (e.g., "D" is less than thirty minutes between a "watch" becoming a "warning") for a given geographic area, the server alert engine 210 may issue alert notices informing recipients to shelter in place.

The server alert engine 210 may utilize artificial intelligence and machine learning to determine whether a future incident may require issuance of an alert notice on a current or similar basis.

As shown by Operation 404G, the server alert engine 210 may retrieve results from examination of one or more locale conditions (if any) provided in a given alert message. Such locale condition examination(s) may occur per one or more Operations 408 as shown in FIG. 4C, or otherwise.

As shown in FIG. 4C and per Operation 408(A), the server alert engine 210 may extract one or more locale condition designations from an alert message. A locale condition designation may specify any geographic area, region, or the like on, above, or below the Earth (including in space) with respect to which the alert message may apply. The locale condition may be specified using any form of geodetic datum such as by latitude and longitude, distance and vector from a given location, or otherwise.

As shown by Operation 408(B), the server alert engine 210 may be configured to convert the one or more locale condition designations extracted from a given alert message into one or more second location condition designations provided in an alert notice. A non-limiting example may include translating latitude and longitude designations into one or more Designated Market Areas (DMAs); where a DMA is a region of the United States used to define television and radio markets, address, city, state, zip code, area code, township, or otherwise. For at least one implementation, the server alert engine 210 may be configured to convert locale conditions extracted from a given alert message into DMA used to identify audiences for one or more television or other video (and/or audio) channels (herein, in short, a "television" channel) received by one or more UDs 118 and with respect to which the providing of content from an alert message is to be presented to a user via such television channels. The results of the Operations of FIG. 4C, may be utilized by the server alert engine 210 in performing one or more of the operations shown in FIG. 4A.

As shown by Operation 4G1 (in FIG. 4A), the server alert engine 210 may identify in an alert notice the affected locales for a given alert message. It is to be appreciated that the affected locales may vary by UDs 118. For example, a mobile UD 118 may be located at a first time in a locale corresponding to an incident, while at a second or other time being located at a second locale that does not correspond to an incident (e.g., the UD 118 moved into or out of an area or direction of travel of severe weather). It is to be appreciated that the server alert engine 210 may or may not know (depending on an implementation being utilized) where a UD 118 is or is not located at any given time. Accordingly, for at least one implementation, the server alert engine 210 may perform Operation 4G1 without knowing locations of one or more, if any, UDs 118, at a given time.

As shown by Operation 4H, the server alert engine 210 may retrieve results from examination of one or more target conditions (if any) provided in a given alert message. Such target condition examination(s) may occur per one or more Operations 410 as shown in FIG. 4D, or otherwise.

As shown in FIG. 4D and per Operation 410(A), the server alert engine 210 may extract one or more target condition designations from an alert message. As used herein, a target condition designation identifies one or more characteristics of a UD 118, a device associated with a UD 118 (e.g., a car associated with a mobile phone), a user associated with a UD 118, or otherwise. The target condition designation may have any degrees of specificity, for example, designating motor vehicles, high profile motor vehicles, flying vehicles, or otherwise. Multiple target condition designations may be specified in an alert message, for example, a vehicle may be both a high profile vehicle and one having a gross vehicular weight of less than a given amount—such light but tall vehicles being potentially more susceptible to a high wind incident.

As shown by Operation 410(B), the server alert engine 210 may identify one or more UDs 118 that have one or more characteristics specified by a given one or more target condition designations. Operation 410(B) may be performed by the server alert engine 210 accessing data stored in a server data store 204, one or more UD data stores 304, a Cloud data store, or otherwise. For at least one implementation, Operation 410(B) may be performed by the server alert engine 210 issuing queries to UDs 118 that ask whether a given UD 118 has the specified one or more characteristics. It is to be appreciated that the characteristic(s) identified as a target condition for a given message may vary by alert message, implementation, or otherwise and may include any identifiable characteristic.

As shown by Operation 410(C), the server alert engine 210 may designate UDs 118 identified per Operation 410(B) as being an "affected UD."

As shown by Operation 4H1 (in FIG. 4A), the server alert engine 210 may identify, in an alert notice broadcast or otherwise transmitted to multiple UDs 110, one or more UDs 118 to which the alert notice pertains.

As shown by Operation 404I, server alert engine 210 may retrieve results from examination of one or more action conditions (if any) provided in a given alert message. Such action condition examination(s) may occur per one or more Operations 412 as shown in FIG. 4E, or otherwise.

As shown in FIG. 4E and per Operation 412(A), the server alert engine 210 may extract one or more action conditions from an alert message. An action condition may specify actions that a user of a UD 118 may be required, recommended, optionally or otherwise to perform or not perform. For example, an action condition may require a user to flee or shelter in place, evacuate, cease or reduce use of resources (e.g., water, electricity, or the like), or otherwise take or refrain from taking one or more actions.

As per Operation 412(B), the server alert engine 210 may identify one or more action results for inclusion in an alert notice.

As shown by Operation 404J (in FIG. 4A), the server alert engine 210 may generate an alert notice to be broadcast or otherwise transmitted to one or more UDs 110, such transmitting occurring under the direction and control of the server connection engine. The alert notice may be generated based upon one or more of the outputs of the operations of FIGS. 4A to 4E. The alert notice may be the same for two or more UDs 118, or may vary by UDs 118, as based upon any given permutation of the results of the operations of FIGS. 4A to 4E.

As shown by Operation 414 (in FIG. 4), the content distributor server 108 may instantiate a server connection engine 212 that transmits a given alert notice (as generated per Operations 4A-4E) to one or more UDs 118. In transmitting the alert notice, the server connection engine 212 may use UD location data and/or UD coupling data in determining how and when to transmit an alert notice to one or more UDs 118. The server alert engine 210 may work cooperatively with the server connection engine 212 to generate and transmit alert notices to UDs 118 in view of then available UD location data and/or UD coupling data. For at least one implementation, the server connection engine 212 may transmit the alert notice to the UDs 118 satisfying, as based on the then available UD location data, a local condition determined per the operations of FIG. 4C. For at least one implementation, the server connection engine 212 may utilize additional data regarding one or more UDs 118, such as additional data specifying whether a given UD 118 satisfies a target condition, can satisfy an action condition, or otherwise. Such additional data may be obtained from the server data store 204, a UD data store 308, from a Cloud based data store, based upon a query and response communication between the content distributor server 108 and a given UD 118, or otherwise obtained or determined. Artificial intelligence and/or machine learning may be used in obtaining and/or determining any additional data, if any, utilized in determining whether to transmit a given alert notice to one or more UDs 118 in based upon one or more alert conditions specified in an alert message.

As shown by Operation 416, the server alert engine 210 may determine, on a periodic, routine, or any given basis, where an updated alert message has been received. If "yes," one or more of the operations of FIGS. 4A to 4E may be executed with respect to any changes in the updated alert message versus the prior alert message.

As shown by Operation 418, the server alert engine 210 may determine, on a periodic, routine, or any given basis, whether an alert message has expired, terminated, or is no longer actionable. If so, the server alert engine 210 may generate an "alert notice terminated" and the process may proceed to Operation 420.

As shown by Operation 420, the server connection engine may transmit the "alert notice terminated" to one or more UDs 118. Such transmission may occur with respect to designated UDs 118, one UD 118, two or more UDs 118, or otherwise.

As shown by Operation 422, the process ends.

User Device (UD) 118

Figure 3:
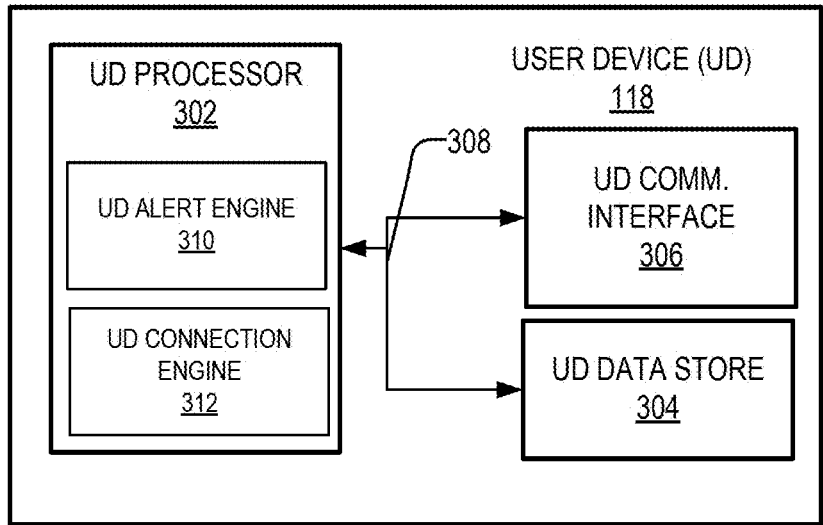
FIG. 3 is a schematic representation of a user device utilized in accordance with at least one implementation of the present disclosure.

As shown in FIG. 3 and in accordance with at least one implementation of the present disclosure, a user device (UD) 118 may include a UD processor 302, a UD data store 304, and a UD communications interface 306. The UD 118 may also include one or more power, security, user interface and the like (not shown), with such components being well known in the art. Any currently available and/or future arising implementations of such components may be used in an implementation of the present disclosure. A UD bus 308 couples the various UD 118 components operably together.

UD Processor 302

The UD processor 302 is herein, also identified as a UD central processing unit (CPU) or "UD CPU". Any known or later arising processor may be used for the UD processor 302. The UD processor 302 may be provided by a processor capable facilitating one or more logics by executing one more computer instructions with respect to data. The UD processor 302 may include one or more physical components configured for data processing operations. Any known or later arising technologies may be utilized in conjunction with an implementation of the present disclosure to facilitate the UD processor 302. The UD processor 302 may execute computer instructions which instantiate one or more computer engine.

For at least one implementation, the UD processor 302 may instantiate a UD alert engine 310 and thereby perform one or more UD alert operations which facilitate the reception, processing and presenting of information provided in an alert notice and/or an alert message to user of a UD 118. For an implementation, UD alert operations may be performed separately by a UD 118 and/or cooperatively with the content distributor server 108, the server alert engine 210, the server connection engine 212, and/or otherwise.

The UD processor 302 may execute computer instructions which instantiate a UD connection engine 312 and thereby perform one or more UD connection operations which facilitate identifying, configuring, coupling, and otherwise using a UD 118 with one or more other system 100 components. For at least one implementation, the UD connection engine 312 may perform UD connection operations separately, in conjunction with, cooperatively, or otherwise with the server connection engine 202. For a non-limiting example, a UD 118 may separately perform one or more UD alert engine 310 operations and/or UD connection engine 312 operations when the content distributor server 108 is not communicatively coupled to the UD 118 at a given time.

The UD processor 302 may instantiate one or more computer engines as one or more threads operating on a computing system having a multiple threaded operating system, such as the WINDOWS, LINUX, APPLE OS, ANDROID, and other operating systems, as an application program on a given device, as a web service, or otherwise. An Application Program Interface (API) may be used to support an implementation of the present disclosure. The UD alert engine 310 and/or UD connection engine 312 may be executed by one or more threads on the UD processor 302, on the Cloud, or otherwise.

The UD processor 302 may be communicatively coupled, by a UD bus 308 or similar structure, to other components of the UD 118 such as the UD data store 304, which may also be referred to as a "computer readable storage medium." The UD data store 304 may be configured to store data and/or computer instructions for use by the UD 118.

UD Alert Engine 310

Figure 5:
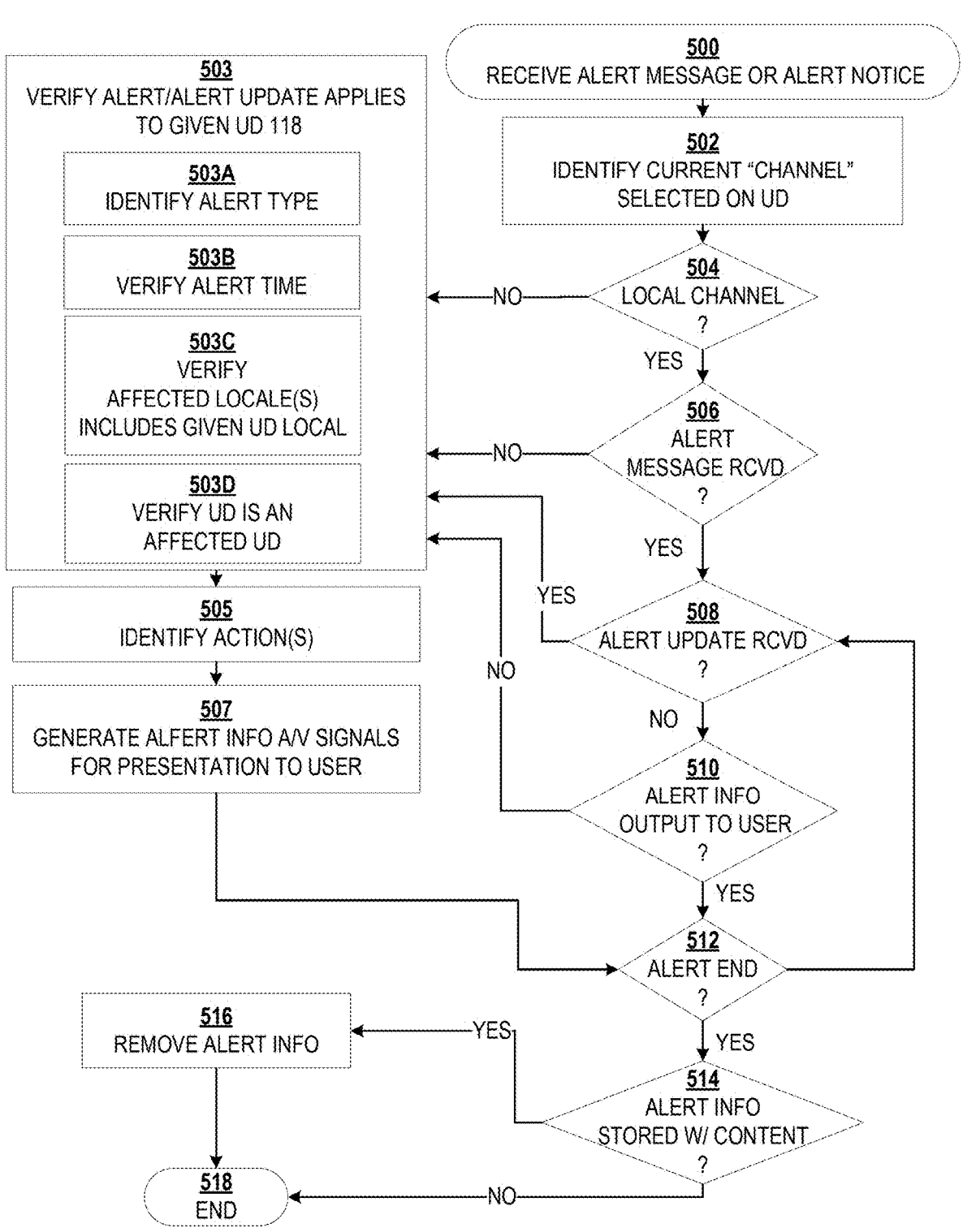
FIG. 5 is a flow chart representing a process executed by a user device to present alerts to a user regardless of whether the user device is configured, at a given time, to receive a local channel, a non-local channel, and/or is in a standby mode of operation and in accordance with at least one implementation of the present disclosure.

With reference to FIG. 5, a UD alert engine 310 configures a UD 118 to receive, process and present data provided by one or more alert notices and/or alert messages as alert information to a user. For at least one implementation a UD alert engine 310 may configure a UD 118 to receive, process and present data provided by one or more alert messages, as alert information, to at least one user. For at least one implementation, a UD alert engine 310 may configure a UD 118 independently of, in cooperation with, or in response to data and/or instructions provided by a content distributor server 108. For at least one implementation, a UD alert engine 310 may perform one or more of the operations depicted in FIG. 5.

UD Connection Engine 312

A UD device connection engine 312 may perform UD connection operations which identify UD communications interface 306 components to use to receive alert notices and/or alert messages and provide data to the content distributor server 108 which supports communication of alert notices by the content distributor server 108 to the given UD 118.

For at least one implementation, the UD connection engine 312 may perform UD connection operations which configure one or more UD communications interface 306 components. For a non-limiting example, the UD connection engine 312 may configure a UD 118 for use with a satellite, wired, wireless, combination thereof, or other coupling. Such coupling may vary.

UD Data Store 304

The UD data store 304 may be storage, multiple storages, or otherwise. The UD data store 304 may be configured to store data, in whole or in part, in any format, including but not limited to, clear text, encrypted, uncompressed, compressed, signed, unsigned, combinations of the foregoing, packetizations, or otherwise. The UD data store 304 may be provided locally with a given UD 118 and/or remotely, such as by a data storage service provided on the Cloud, and/or otherwise. Storage of data may be managed by a storage controller (not shown) or similar component. It is to be appreciated that such storage controller manages the storing of data and may be instantiated in one or more of the UD data store 304, the UD processor 302, on the Cloud, or otherwise.

Any known or later arising storage technologies may be utilized in conjunction with an implementation of the present disclosure to facilitate the UD data store 304. Non-limiting examples of devices that may be configured for use as UD data store 304 include electrical storages, such as EEPROMs, random access memory (RAM), Flash drives, and solid-state drives, optical drives such as DVDs and CDs, magnetic storages, such as hard drive discs, magnetic drives, magnetic tapes, memory cards, such as Compact Flash (CF), Secure Digital (SD) cards, Universal Serial Bus (USB) cards, and others.

Available storage provided by the UD data store 304 may be partitioned or otherwise designated by the storage controller as providing for permanent storage and temporary storage. Non-transient data, computer instructions, or other the like may be suitably stored in the UD data store 304. As used herein, permanent storage is distinguished from temporary storage, with the latter providing a location for temporarily storing data, variables, or other instructions used for a then arising data processing operations. A non-limiting example of a temporary storage is a memory component provided with and/or embedded onto a processor or integrated circuit provided therewith for use in performing then arising data calculations and operations. Accordingly, it is to be appreciated that a reference herein to "temporary storage" is not to be interpreted as being a reference to transient storage of data. Permanent storage and/or temporary storage may be used to store transient and non-transient computer instructions, and other data.

UD Communications Interface 306

UD 118 may include a UD communications interface 306. The UD communications interface 306 may be configured to use any known or later arising communications and/or networking technologies which facilitate coupling of the UD 118 to other system 100 components, including but not limited to the content distributor server 108.

The UD communications interface 306 may include one or more data ports (which are also commonly referred to an input/output interfaces, cards, or the like), antenna, transceivers, amplifiers and other known and/or later arising physical device layer components (e.g., on the OSI model) which facilitate coupling of the UD 118 with one or more system 100 components. Such communication interfaces and components are well-known in the art and non-limiting examples include Ethernet cards, USB and storage medium interface cards, radio frequency transceivers, and others.

For at least one implementation, one or more operations of the UD alert engine 310 and the UD connection engine 312 are illustrated in the process flow shown in FIG. 5. Such operations are non-limiting and for at least one implementation of the present disclosure. Other operations, sequences thereof, combinations, and/or permutations thereof may be used in accordance with other implementations of the present disclosure.

UD Alert Engine 310

As per Operation 500, an alert message and/or an alert notice may be received by a UD 118. For at least one implementation, a UD 118 may be configured to receive alert messages directly, e.g., alert messages may be received directly from an alert authority 102, via an IPAWS 106, via an intermediary such as one provided by an Internet based server, via a broadcast system 110, via a wireless communications system 114, or otherwise. For at least one implementation, operations performed by a UD alert engine 310 for an alert notice or an alert message may be similar and/or identical.

As per Operation 502, the UD alert engine 310 may identify a current channel selected by the UD 118 for the presentation of content. If a current channel is not selected, for at least one implementation, the UD 118 may select to a channel and may activate (if not already activated) one or more user interfaces (as described below) for presentation of alert information (as provided in an alert notice and/or an alert message) to a user.

As per Operation 504, the UD alert engine 310 may determine whether the current channel is a local channel. If "no," the UD alert engine 312 may perform Operations 503, 505, 507 and 509. If "yes," the process may continue with Operation 506.

As per Operation 506, the UD alert engine 310 may confirm that an alert message has been received on the local channel. If "no," the process may include Operations 503, 505, 507 and 509. If "yes," the process may continue with Operation 508.

As per Operation 508, the UD alert engine 310 may determine whether an alert notice provides an update to a prior received alert notice and/or alert message. If "yes," the process may include Operations 503, 505, 507 and 509. If "no," the process may continue with Operation 510.

As per Operation 510, the UD alert engine 310 may determine whether alert information ("alert info") has been output to a user interface for presentation to a user. If "no," the process may include Operations 503, 505, 507 and 509. If "yes," the process may continue with Operation 510. It is to be appreciated that alert info may be provided in one or more alert messages that may not be included in a local channel transmission. Accordingly, a UD alert engine 310 may be configured to determine whether alert info received in a given alert notice or alert message and alert info previously presented to user correspond. For at least one implementation, such correspondence may be determined based on a packet identifier number, a packet time, or otherwise.

As per Operation 512, the UD alert engine 310 may determine whether an alert time or period has ended (or passed) or a given alert has been otherwise terminated. If "no," the process may continue with Operation 508. If "yes," the process may continue with Operation 514. For at least one implementation, the UD alert engine 310 may be configured to perform the 508-512 operation loop for a maximum number of iterations. For at least one implementation, such iterations are the longer of a designate alert delay D, a time period of applicability specified in an alert notice or an alert message, a default period, for example, twelve (12) hours, or the like.

As per Operation 514, the UD alert engine 310 may determine whether alert info previously received and/or output to a user interface for presentation to a user has been stored with a given content data (e.g., an alert banner being stored with content for a given television program or the like). It is to be appreciated that if so stored, the alert info may be presented to a later viewing user even though an alert is no longer active or pertinent to the user (e.g., the respective UD 118 no longer being located within the given environment). If "yes," the process may continue with Operation 516. If "no," the process may end.

As per Operation 516, the UD alert engine 310 may remove alert info stored with content data. For at least one implementation where the alert info is embedded with and not readily extracted from the content data and another transmission of the content data may be available, the UD alert engine 310 may be configured to obtain alternative segments of the content data that do not contain the alert info. For a non-limiting example, a content segment containing an embedded therein alert information for an alert notice generated for an eastern United States locale (e.g., a first DMA) may be replaced, after an alert period has ended, by a later occurring transmission of the content segment in a western United States locale (e.g., a second DMA) where the alert information is not embedded. Other approaches for obtaining alternative content segments and/or removing alert information from a given content segment may be used, with a non-limiting example including use of an overlay (for a video presentation) which masks the expired alert information previously embedded into and stored, as so embedded, with the content data.

It is to be appreciated that a need to remove alert information from stored content data may also occur with alert messages received directly and presented by a UD 118. For at least one implementation, the UD alert engine 310 may be configured to output alert information received in an alert notice in a format that facilitates non-embedding and/or removal of the alert information from the content data as stored and/or as later presented to a user.

As per Operations 503, 503A, 503B, 503C, and 503D, the UD alert engine 310 may be configured to verify an alert notice and/or an alert update applies to the given UD 118. One or more verification may be performed with respect to a type condition (as per Operation 503A), time condition (as per Operation 503B), locale condition (as per Operation 503C), and the affected UDs includes the given UD (as per Operation 503D). For at least one implementation, at least one of these verifications may be passed and the process may proceed with Operation 505. For another implementation, two or more of these verifications may be passed before the process proceeds with Operation 505. For yet another implementation, three or more of these verifications may be passed before the process proceeds with Operation 505. For yet another implementation, these verifications may be passed before the process proceeds with Operation 505.

As per Operation 505, the UD alert engine 310 may identify one or more actions specified in an alert notice and/or an alert update. For at least one implementation, a UD alert engine 310 may verify, based on data stored on the UD 118 or otherwise, whether a given user, associated with the UD 118, can perform one or more actions. Such verification may be used to generate responsive message(s), to a content distributor server 108, first responders, and/or others, informative of a status of actions performed, not performed, incapable of being performed, or the like.

As per Operation 507, the UD alert engine 310 may generate alert info signals for output to a user interface and presentation by the user interface to one or more users. The user info signals may be provided in any one or more signal formats (e.g., audio, video, augmented reality, or the like), for any given duration, and the like. For at least one implementation, alert info signals may include an audible tone followed by audio and/or video data informing users of the alert conditions, actions proscribed and/or prescribed, and the like. For at least one implementation, alert info may be provided as a graphic overlay on a then being presented content data. The graphic overlay may have any form and, for a non-limiting example, could scroll across a display, could flash on the overlay banner with the background of the banner getting lighter and darker, or a constant background on the banner with the letters getting brighter and darker. The alert info may be generated in a visual manner that captures a user's attention to the alert. The alert info may be stored for presentation during later presented channels or video streams. The alert info may be presented in any user format, such as a scrolling text, in an overlay text box, in a chat window, in a side-by-side window, as a pop-up window, or otherwise. The alert info may include other information, such as information obtained from Cloud resources, such as maps, images, sounds, or the like that provide information relevant to the alert. For example, a tornado warning may result in the alert info being presented to a user (via a user interface) including a map of the alert locale, direction of travel arrow for the tornado, identification of locations for shelter, or the like.

User Interfaces

The content distributor server 108 and/or the UDs 118 may include respective user interfaces (not shown). A user interface may include any known or later arising human to device interface user interface device(s). Non-limiting examples of user interface device(s) include audible input/ output ("I/O") interfaces for use with audio I/O devices, visual I/O interfaces for use with visual I/O devices, and the like.

For at least one implementation, an audio I/O interface may support receiving and/or presenting of audible content. Such audible content (which is also referred to herein as being "audible signals") may include spoken text, sounds, or any other audible information. Such audible signals may include one or more humanly perceptible audio signals, where humanly perceptible audio signals typically arise between 20 Hz and 20 KHz. The range of humanly perceptible audio signals may be configurable to support an audible range of a given individual user. An audio I/O interface includes hardware and computer instructions (herein, "audio technologies") which supports the input and output of audible signals between a user and an electronic device, such as the content distributor server 108 or a UD 118. Such audio technologies may include, but are not limited to, noise cancelling, noise reduction, technologies for converting human speech to text, text to speech, translation from a first language to one or more second languages, playback rate adjustment, playback frequency adjustment, volume adjustments and otherwise. An audio I/O interface may use one or more microphones and speakers to capture and present audible signals respectively from and to a user.

A visual I/O interface includes hardware and computer instructions (herein, "visible technologies") which supports the input by and output of visible signals to a user using a content distributor server 108 or a UD 118. Such visible technologies may include technologies for converting images (in any spectrum range) into humanly perceptible images, converting content of visible images into a given user's perceptible content, such as by character recognition, translation, playback rate adjustment, playback frequency adjustment, and otherwise. A visual I/O interface may be configured to use one or more visual I/O devices, such as the internal display (not shown) and/or external display (not shown), that are configured to present visible signals to a user. A visual I/O interface may be configured to use one or more image capture devices. Non-limiting examples include lenses, digital image capture and processing software and the like. Accordingly, it is to be appreciated that any existing or future arising visual I/O interfaces, devices, systems and/or components may be utilized.

It is to be appreciated that the process flow shown in FIGS. 4-5 and discussed above are for illustrative purposes and is not to be considered limiting an implementation of the present disclosure or an implementation thereof to any specific sequence of operations.

Although various implementations have been described above with a degree of particularity, or with reference to one or more individual implementations, those skilled in the art could make alterations to the disclosed implementations without departing from the spirit or scope hereof. The use of the terms "approximately" or "substantially" means that a value of an element has a parameter that is expected to be close to a stated value or position. As is well known in the art, there may be minor variations that prevent the values from being as stated. Accordingly, anticipated variances, such as 10% differences, are reasonable variances that a person having ordinary skill in the art would expect and know are acceptable relative to a stated or ideal goal for one or more implementations of the present disclosure. It is also to be appreciated that the terms "top" and "bottom," "left" and "right," "up" or "down", "first", "second", "next", "last", "before", "after", and other similar terms are used for description and case of reference purposes and are not intended to be limiting to any orientation or configuration of any elements or sequences of operations for the various implementations of the present disclosure. Further, the terms "coupled," "connected" or otherwise are not intended to limit such interactions and communication of signals between two or more devices, systems, components or otherwise to direct interactions; indirect couplings and links may also occur. Further, the terms "and" and "or" are not intended to be used in a limiting or expansive nature and cover any range of combinations of elements and operations of an implementation of the present disclosure. Other implementations are therefore contemplated. It is intended that matter contained in the above description and shown in the accompanying drawings be interpreted as illustrative of implementations and not limiting. Changes in detail or structure may be made without departing from the basic elements of the present disclosure as defined in the following claims.

The invention claimed is:

1. A user device comprising:
   a user device data store (UDDS);
      wherein the UDDS non-transitorily stores first computer instructions which, when executed, instantiate a user device alert engine (UDAE);
   a user device processor coupled to the user device data store;
   a user interface coupled to the user device processor and configured to output information to a user of the user device;
   wherein the user device processor, when executing the first computer instructions, instantiates the UDAE which configures the user device to perform alert operations comprising:
      receiving an alert message that includes an alert;
      identifying a current channel selected on the user device;
      determining if at least one of a set of conditions exists;
         wherein the set of conditions include:
            the current channel is not a local channel;
            the local channel has not received the alert message;
            an alert update has been received; and
            alert information has not been output to the user via the user interface.

2. The user device of claim 1,
   when at least one of the set of conditions exists,
      identifying, from the alert message, a target condition;
      determining if the target condition identifies at least one characteristic of the user device; and
      when the target condition identifies at least one characteristic of the user device, generating an alert notice for presentation to the user via the user interface.

3. The user device of claim 2,
   wherein, when the at least one of the set of conditions exists, the alert operations further comprise:
      identifying, from the alert message, an alert type condition; and
      when the alert type condition is a warning,
         determining, from the alert message, an alert time condition; and
         wherein the alert time condition is one of a past time period, a current time period, and a future time period.

4. The user device of claim 3, wherein, when the alert type condition is a warning that applies to the current time period, the alert operations further comprise:

identifying, from the alert message, an affected locale;

determining a current location of the user device; and determining whether the affected locale includes the current location of the user device.

5. The user device of claim 4, wherein, when the alert type condition is a warning and the alert time condition is for a future time period, the alert operations further comprise:

determining whether the alert message includes a delay period; and when the delay period is included in the alert message and upon expiration of the delay period, performing the alert operations again.

6. The user device of claim 5, wherein the alert operations further comprise:

determining whether the alert message includes an alert notice upgrading the alert type condition to a warning; and when the alert message includes the alert notice upgrading the alert type condition to a warning, identifying, from the alert message, at least one action for the user to perform.

7. The user device of claim 6, wherein the alert operations further comprise:

generating at least one alert information signal that identifies to the user, via the user interface, the at least one action for the user to perform.

8. The user device of claim 2, wherein the alert message includes a first alert condition and a second alert condition.

9. The user device of claim 8, wherein the first alert condition specifies an alert type;

wherein the second alert condition specifies a time period;

wherein the alert message includes a third alert condition specifying an action for the user of the user device to take or refrain from taking during the time period; and wherein the alert message further identifies the action.

10. The user device of claim 9, wherein the alert type is one of a warning, a watch, and an advisory.

11. The user device of claim 8, further comprising:

determining whether a prior alert type condition, received in a prior alert message, specifies a watch or an advisory;

determining whether the alert message upgrades the prior alert type condition to a warning; and identifying, in the alert message, at least one action for the user to perform when the prior alert type condition is upgraded.

12. The user device of claim 8, wherein the alert message include a third alert condition;

wherein the third alert condition identifies a first locale;

wherein the alert operations further comprises:

identifying, in the alert message, the third alert condition; and determining whether the user device is, at a given time, at the first locale; and while the user device is located at the first locale, generating alert information signals, for presentation to the user via the user interface, that are based on the first alert condition, the second alert condition, and the third alert condition.

13. A process, for presenting alerts to a user of a user device, comprising:

receiving, by a user device, an alert message that includes an alert;

wherein the user device includes a user interface;

identifying a current channel selected on the user device;

determining if at least one of a set of conditions exists at the user device;

wherein the set of conditions include:

the current channel is not a local channel;

the local channel has not received the alert message;

an alert update has been received; and alert information has not been output to the user via the user interface; and when at least one of the set of conditions exists, identifying, from the alert message, a target condition;

determining if the target condition identifies at least one characteristic of the user device; and when the target condition identifies at least one characteristic of the user device, generating an alert notice for presentation to the user via the user interface.

14. The process of claim 13, wherein, when the at least one of the set of conditions exists, the process further comprises:

identifying, from the alert message, an alert type condition; and when the alert type condition is a warning, determining, from the alert message, an alert time condition; and wherein the alert time condition is one of a past time period, a current time period, and a future time period.

15. The process of claim 14, wherein, when the alert type condition is a warning that applies to the current time period, the process further comprises:

identifying, from the alert message, an affected locale;

determining a current location of the user device; and determining whether the affected locale includes the current location of the user device.

16. The process of claim 14, further comprising:

determining whether the alert message includes an alert notice upgrading the alert type condition to a warning; and when the alert message includes the alert notice upgrading the alert type condition to a warning, identifying, from the alert message, at least one action for the user to perform.

17. A computer readable medium containing non-transitory computer instructions which, when executed by a processor, configure a user device to perform alert operations comprising:

receiving, by a user device, an alert message that includes an alert;

wherein the user device includes a user interface;

identifying a current channel selected on the user device;

determining if at least one of a set of conditions exists at the user device;

wherein the set of conditions include:

the current channel is not a local channel;

the local channel has not received the alert message;

an alert update has been received; and alert information has not been output to the user via the user interface; and when at least one of the set of conditions exists, identifying, from the alert message, a target condition;

determining if the target condition identifies at least one characteristic of the user device; and when the target condition identifies at least one characteristic of the user device, generating an alert notice for presentation to the user via the user interface.

18. The computer readable medium of claim 17, wherein, when the at least one of the set of conditions exists, the alert operations further comprise:

identifying, from the alert message, an alert type condition; and when the alert type condition is a warning, determining, from the alert message, an alert time condition; and wherein the alert time condition is one of a past time period, a current time period, and a future time period.

19. The computer readable medium of claim 18, wherein, when the alert type condition is a warning that applies to the current time period, the alert operations further comprise:

identifying, from the alert message, an affected locale;

determining a current location of the user device; and determining whether the affected locale includes the current location of the user device.

20. The computer readable medium of claim 19, when at least one of the set of conditions exists, the alert operations further comprise:

identifying, from the alert message, a target condition;

determining if the target condition identifies at least one characteristic of the user device; and when the target condition identifies at least one characteristic of the user device, generating an alert notice for presentation to the user via the user interface.

* * * * *